July 4, 1950 W. T. GOLLWITZER 2,513,998

CODE TRANSLATING MECHANISM

Original Filed June 12, 1946 4 Sheets-Sheet 1

INVENTOR.

Walter T. Gollwitzer

BY

Wallace and Cannon

ATTORNEYS

INVENTOR.
Walter T. Gollwitzer
BY
Wallace and Cannon
ATTORNEYS

INVENTOR.
Walter T. Gollwitzer
BY
Wallace and Cannon
ATTORNEYS

CODE TRANSLATING MECHANISM

Original Filed June 12, 1946 4 Sheets-Sheet 4

Inventor:
Walter T. Gollwitzer
By Wallace and Cannon
attys.

Patented July 4, 1950 2,513,998

UNITED STATES PATENT OFFICE 2,513,998

CODE TRANSLATING MECHANISM

Walter T. Gollwitzer, Euclid, Ohio, assignor to Addressograph-Multigraph Corporation, Wilmington, Del., a corporation of Delaware Original application June 12, 1946, Serial No. 676,329. Divided and this application January 2, 1948, Serial No. 278

4 Claims. (Cl. 235—61.6)

This application is a division of my copending application Serial No. 676,329, filed June 12, 1946, now Patent No. 2,501,444, and insofar as some of the divided subject matter disclosed and claimed herein, said copending or parent application was a continuation in part of my application Serial No. 587,579, filed April 10, 1945.

This invention relates to code translators that are adapted for use in translating a multiple element code into a single element positional representation, as for example in the attainment of record controlled operation of adding or calculating machines, or punching or other record producing machines.

Where records such as cards or printing and control devices are to carry data representations, such as numerical data representations, it is often desirable to accomplish this through the use of a two-element code so as to conserve space on the record, and when such data representations are to be sensed for control purposes it is necessary that the two-element representations be translated into a single element representation in order to accomplish the desired control operations. When the control operation is to be attained by a mechanical or positional representation in any selected one of a plurality of positions, it is advantageous to accomplish the translating action by mechanical means, and to enable this to be accomplished in a simple and effective manner by means of a rugged character is the primary object of the present invention. Further objects related to the foregoing are to afford such a mechanical translator that is particularly adapted for use in the control of set-up slides of the kind used in calculating machines, variable printers, punching machines and the like, and to so construct and arrange such translating means that it cooperates in a simple and advantageous manner with the total taking means when used as a set-up control in an adding machine.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
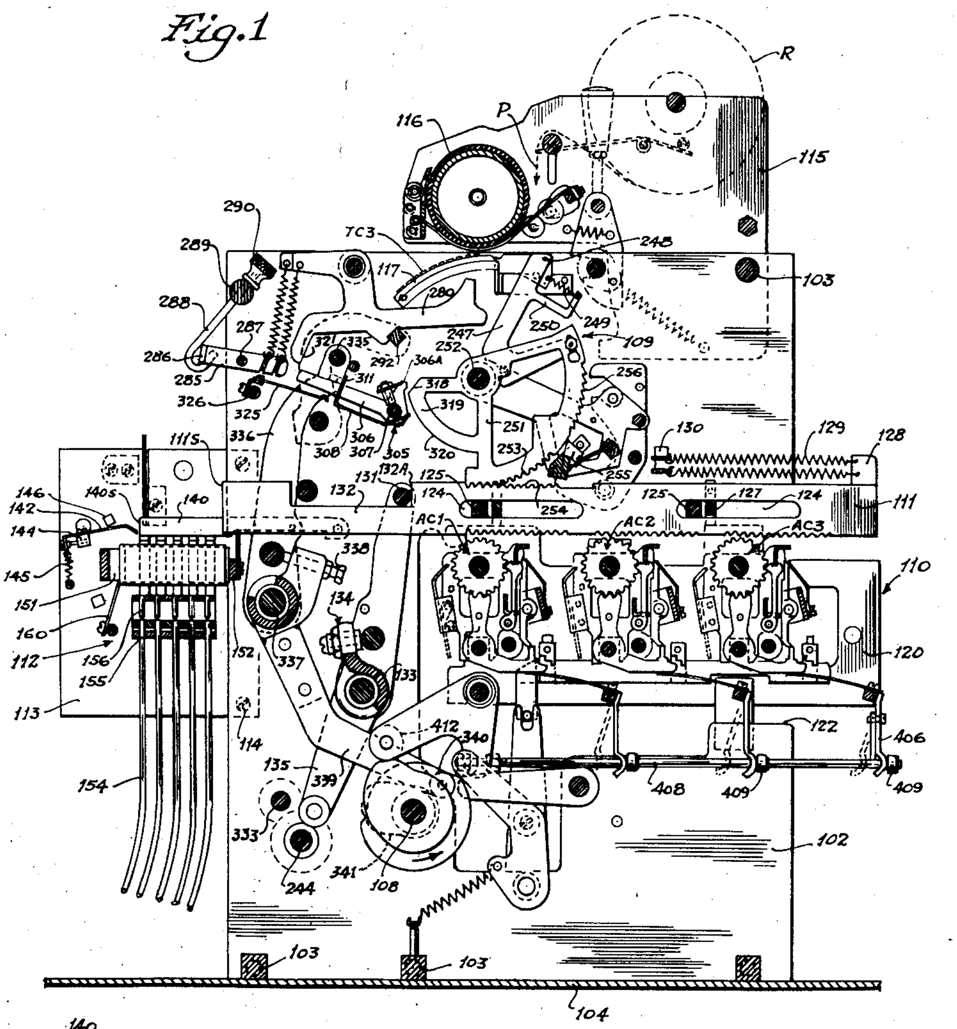
Fig. 1 is a vertical sectional view taken through an adding and printing machine embodying the translator mechanism of the present invention.
Figure 1B:
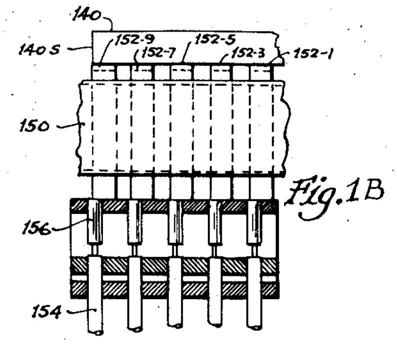
Fig. 1B is an enlarged fragmentary portion of the translating mechanism.

For purposes of disclosure the invention is herein illustrated in Figs. 1 to 7 as it is embodied in the adding unit 100 that is shown Figs. 37 to 91A of my aforesaid parent application Serial No. 676,329. The adding unit 100 embodies a frame having spaced side plates 101 and 102 that are rigidly associated in the desired spaced relation by a plurality of spacer bars 103. The frame that is thus afforded is adapted to be mounted as for example on a mounting plate 104 so that the side plates 101 and 102 are disposed in a vertical or upstanding relationship. The frame that is thus afforded also has another upstanding side plate 105 disposed to the left and in spaced relation with respect to the side plate 101 so that a main cam shaft 108 of the machine may be extended through and supported by the several plates 101, 102 and 105 near the lower edges thereof as will be evident in Fig. 2.

Figure 1A:
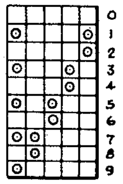
Fig. 1A is a diagrammatic illustrating a two-element code which is adapted to be translated to be adapted by the present mechanism into a ten element code or positional representation.

The adding machine 100 embodies a variable printing mechanism 109, Fig. 1, and accumulator mechanism 110, and the variable printing mechanism 109 and the accumulator mechanism 110 are adapted to be operated by a plurality of horizontally movable slides 111 that are mounted for reciprocating movement in a horizontal direction between the side plates of the frame. In the entry of numerical amounts into the variable printing mechanism 109 and the variable accumulator mechanism 110 the slides 111 are settable in accordance with the desired numerical amounts by set up mechanism 112 that is mounted forwardly of the frame by means of side plates 113 that are secured at 114 to the side plates 101 and 102. The setup mechanism 112 is under the present invention so constructed and arranged so as to be settable by means operating in accordance with the five-element code that is illustrated in Fig. 1A of the drawings.

As will hereafter become evident, the setting movements of the slides 111, as such setting movements are governed by the setup mechanism 112, are utilized to set the variable printing mechanism 109 for printing the setup numerical amounts upon a strip of paper P that is withdrawn from a roll R carried in a paper feed mechanism 115, such web of paper P being advanced beneath a platen roller 116 so as to be disposed at the printing position over a plurality of settable type segments 117 that form part of the variable printing mechanism 109. It will be recognized of course that an inked ribbon that is disposed between the web of paper P and the type segments 117 so that impressions may be made from the type segments on to the paper P in accordance with the set-up of the variable printing mechanism 109.

The movements of the slides 111 are also utilized to introduce numerical amounts into the accumulator mechanism 110, which as illustrated in Fig. 1, embodies three accumulators identified as AC1, AC2 and AC3. The three accumulators that are thus afforded are mounted as will hereinafter be described between a pair of relatively small side plates 120 and 121 thereby to afford a separate mounting for the accumulator unit 110, and the side plates 101 and 102 have relatively wide openings or slots 122 formed therein to extend forwardly from the rear edges of these side plates so that accumulator unit 110 may be moved forwardly into the slots 122 and into position beneath the slides 111. The unit 110 is then secured in position with respect to the main frame of the machine.

Figure 6:
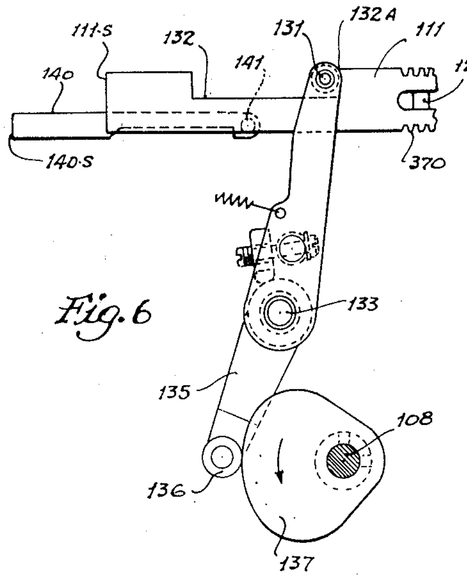
Fig. 6 is a view showing the restoring bail for the slides of the adding machine.
Figure 7:
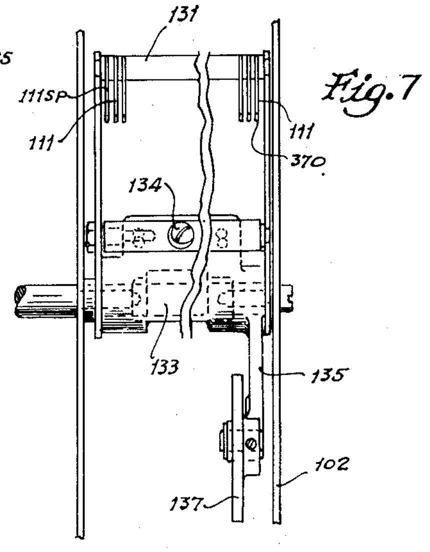
Fig. 7 is a view taken from the left in Fig. 6.
Figure 8:
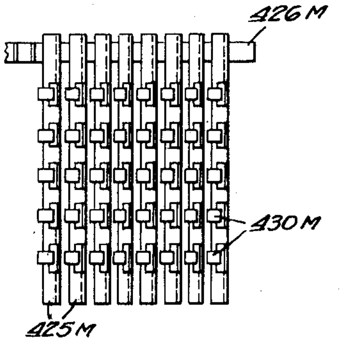
Fig. 8 is a plan view of another embodiment of the translating mechanism and showing the slides independently of the mounting means.
Figure 9:
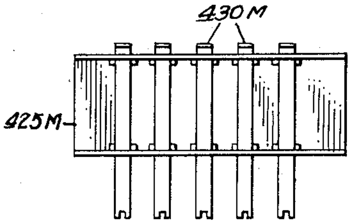
Fig. 9 is a side view of one of the slides.
Figure 10:
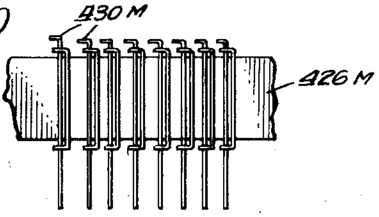
Fig. 10 is an end view of the group of slides shown in Fig. 8.

The slides 111 have longitudinal slots 124 formed therein, and these slides are mounted for horizontal sliding movement on supporting bars 125 that are extended between the side frames 101 and 102, and one such slide 111 is afforded for each order of the accumulator. The several slides 111 are maintained in the desired spaced relationship on the supporting bars 125 by comb bars 127 that are also disposed so as to extend through the slots 124 and are connected to the side plates 101 and 102. At their rear ends slides 111 have upstanding ears 128 and springs 129 are extended from the ears 128 in a forward direction so as to be connected at their forward ends on anchoring bars 130 that are in turn supported by the side plates 101 and 102. The slides 111 are individually urged by the springs 129 in a forward direction from the normal or restored positions thereof shown in Fig. 1 of the drawings, and the forward or setting movements of the individual slide bars 111 are controlled by the set up mechanism 112. The slide bars 111 are returned to their normal or rest positions of Fig. 1 by a restoring bail 131, the cross bar of which is disposed within a slot 132 that is formed in the upper edges of all of the slide bars 111, and the slot 132 affords a rear end edge 132A that may be engaged by the cross bar of the bail 131 to move all of the slides 111 rearwardly to their restored positions. The restoring bail 131 is mounted on a rock shaft 133 and is adjustably connected thereto by means of a screw thread device 134. The rock shaft 133 has an arm 135 extended downwardly therefrom as shown in Figs. 1 and 6, and a cam roller 136 on the lower end of the arm 135 engages a restoring cam 137 fixed on the main cam shaft 108 of the machine. The cam 137, as shown in Fig. 6 is of such a configuration that when the rotation of the cam shaft 108 is started from the initial or rest position shown in Fig. 6, the bail 131 will be moved forwardly or in a counterclockwise direction as illustrated in Figs. 1 and 6, and this permits forward or setting movement of the slides 111 under control of the setup mechanism 112. After the slides 111 have thus been set up, and in the last half of the cycle of operation of the machine, the cam 137 rocks the restoring bail in a clockwise direction so as to thereby move the slides 111 into the normal or restored position of Fig. 1.

The forward or setting movements of the slides 111 are governed by the setup mechanism 112 so as to set the slides 111 in accordance with any desired numerical amount that is to be printed by the variable printing mechanism 109 and which is to be entered into the accumulating mechanism 110, and for cooperation with the setup mechanism 112, each slide 111 has a pawl 140 pivoted thereto at 141 as will be evident in Figs. 1 and 6, and the pawls 140 are in each instance arranged to extend forwardly beyond the forward end edge 111S of the slide 111. Each pawl 140 terminates in a forward edge 140S and when the pawls 140 are disposed in their lower or horizontal positions shown in Fig. 1 of the drawings, the forward edge 140S is disposed opposite the rear edge of a stop plate 142. The stop plate 142 is mounted for rocking movement on a rock shaft 144 and a spring 145 normally urges the stop plate 142 into its upper or effective position as determined by an adjustable or settable stop 146. When the stop plate 142 is in its effective position of Fig. 1, the end edges 140S of the pawls 140 will normally engage the stop plate 142 when the restoring bail 131 is moved forwardly or to the left in Fig. 1, and the movement of a related slide bar 111 will in such an instance be relatively slight and the slide bar 111 will remain in its zero position. When a slide bar is to set to a position representative of a significant digit, the pawl 140 thereof is pivoted in an upward direction so as to move their end edge 140S thereof out of alignment with the stop plate 142, and this is accomplished by the setup mechanism 112 in the course of the operation of such setup mechanism.

Figures 4, 5:
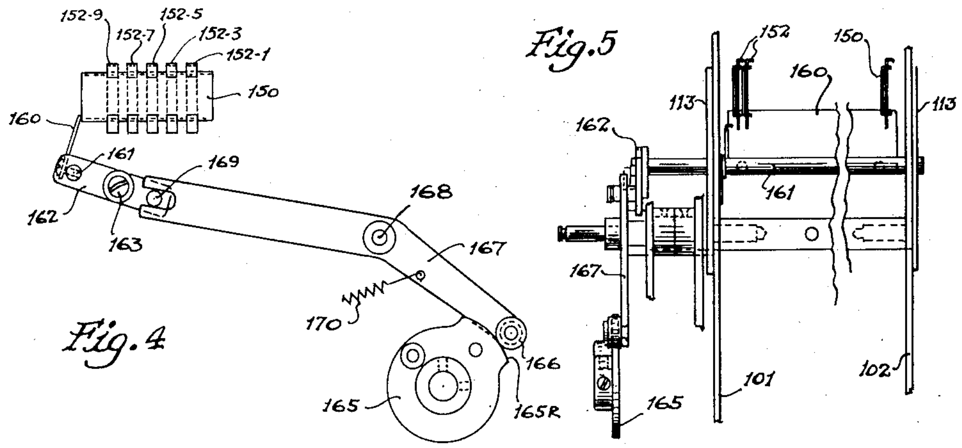
Fig. 4 is a view showing another portion of the restoring mechanism.
Fig. 5 is a fragmentary elevational view taken from the left in Fig. 4.

Thus the setup mechanism 112 embodies a plurality of slide plates 150, one of which is provided for each of the slide bars 111, and the slide plates 150 are suported for limited horizontal sliding movement in a pair of supporting combs 151 and 152 that are in turn supported between the two plates 113. Each slide plate 150 has five vertically movable stop pins 152 mounted therein for vertical sliding movement, and these stop pins 152 are so disposed that the upper ends thereof are located beneath the lower edge of the forwardly projecting portion of the pawl 140 to which such slide plate 150 is allocated, and by upward setting movement of any one of the pins 152, the related pawl 140 may be shifted to its raised or released position wherein the stop plate 142 will be ineffective to engage or stop forward setting movement of such pawl 140. The several stop pins 152 are so spaced that the right hand edges thereof are spaced apart in an amount equal to two units of setting movement of the related slide 111. Moreover, the left-hand edge of the left-hand stop pin 152—9, as viewed in Fig. 4, is so located that when the slide plate 150 is in its normal or raised position of Fig. 1, such left-hand edge of the pin 152—9 will be disposed in alignment with the end edge 140S of the related pawl 140. Thus, as the stop pin 152—9 is moved to its upper or set position, it will not only move the pawl 140 to its released position, but will also be disposed so that the stop pin 152—9 will be in a position to engage the adjacent edge of the stop plate 142. Hence when a stop pin 152—9 is actuated or set, it will maintain the slide plate 150 thereof in the normal or rearward position of Fig. 1. In the event, however, that a stop pin 152—9 of a plate 150 is not so actuated, the actuation of any other of the pins 152 of such plate will not only release the pawl 140, but will also permit movement of the related slide 150 in a forward or left-hand direction, Fig. 1, in an amount equal to one unit of setting movement of the slide 111. Such movement of the slide 150 is limited by the comb bar 151.

With the arrangement that is thus afforded the slides 111 may be set in accordance with numerical or digital values that are represented by a five-element code as shown in Fig. 1A of the drawings. Under and in accordance with this code, a zero value is represented by the absence of an indication in any of the five positions of the code, such five positions being indicated by the five vertical columns shown in Fig. 1A. Under such code, an indication is afforded in the fifth or left-hand code position for each of the odd numbers or digits, and as to such odd digits an additional indication is afforded in one of the other of the columns. Thus for the digit "1," an additional indication is afforded in the first or right-hand column, as to the digit "3," an additional indication is afforded in the second column from the right, as to the digit "5," an additional indication is afforded in the third column from the right, while as to the digit "7" an additional indication is afforded in the fourth column from the right. With respect to the even digits, it will be observed that but one indication is employed, the digit "2" being represented by an indication in the first or right-hand column, the digit "4" being represented by an indication in the second column from the right, the digit "6" being represented by an indication in the third column from the right, while the digit "8" is represented by an indication in the fourth column from the right.

Thus in the operation of the setup mechanism 112, the pins 152 may be selectively actuated, either singly or in pairs with respect to each slide plate 150 so as to control setup movement of the slides 111 in the several orders of the mechanism. In the present instance the stop pins 152 are actuated by individual Bowden cables 154, one such cable being provided for each stop pin 152 in each order of the machine into which numerical or digital amounts are to be introduced. The Bowden cables 154 have the sheaths thereof anchored in an anchoring plate 155 that is extended between the plates 113, and the wire of each cable 154 is connected to the lower end of a plunger 156. The plunger 156 that is associated with a particular Bowden cable is so arranged as to be disposed beneath the lower end of the stop pin 152 to which the Bowden cable is allocated so that by actuation of a particular Bowden cable the related stop pin 152 may be moved to its raised or active position. It will be observed that the plungers 156 are relatively narrow so that when a plunger is actuated to a projecting upper position, this plunger will not stand in the way of the one-space movement that may be required with respect to the related slide plate 150. In other words, the lower end of the stop pin that is disposed to the right, Fig. 1, of such an actuated plunger 156 will not engage such an actuated plunger in the course of a one-space movement to the left. The sensing impulses for operating such Bowden cables may be derived from any suitable sensing means operating to sense coded perforations or the like in cards, printing and control devices or the like.

With the mechanism that is thus described, the set up movements of the slides 111 may readily be controlled in accordance with the digital value that is to be introduced into the several orders of the machine. Thus when a zero is to be introduced into a particular order of a machine, all of the stop pins 152 will remain in their lower or ineffective positions so that the pawl 140 of the related slide 111 will remain in its lower or effective position. Thus when the restoring bail 131 moves to the left, Fig. 1, the end 140S of such pawl 140 will engage the stop plate 142 so as to hold the related slide 111 in its zero position. If the digit 1 is to be introduced into a particular order of the machine, the stop pin 152—9 and the stop pin 152—1 will be actuated, thereby to raise the pawl 140 to its ineffective or released position. The setting of the pin 152—9 will place such pin in a position to engage the stop plate 142, thus to hold the related slide 150 in its normal or right-hand position. Hence when the restoring bail 131 moves to the left, the related slide 111 will move through but one unit of setting movement, such movement being determined by the engagement of the edge 111S with the adjacent edge of the stop pin 152—1.

As to all the odd digits, the action of the stop pin 152—9 in holding the slide plate 150 against forward or left-hand movement will be the same, and the other of the stop pins 152 that is actuated in each instance will serve to limit the movement of the slide 111 in a left-hand or setting direction, Fig. 1. Thus as to the digit 3, the stop pin 152—3 serves to stop the setting movement of the slide 111, while with respect to the digits 5 and 7, the stop pins 152—5 and 152—7 respectively serve to accomplish this limiting function.

With respect to the even digits, it will be recalled that the stop pin 152—9 is not actuated, and hence with respect to each such even digit, the related slide plate 150 will be allowed to move one space forwardly or to the left in Fig. 1. Hence in setting up the digit 2, the stop pin 152—1 will be engaged by the edge 111S of the related slide 111 after the slide is moved through one unit of setting movement, and the slide 111 will then act upon the pin 152—1 to move the slide plate 150 an additional unit to the left, thereby bringing the slide 111 to rest after the slide is moved through two units of setting movement. A similar action takes place with respect to the other even digits.

After the slides 111 have been thus set and after the various operations have been performed and the slides 111 have been restored to their normal or rearward positions of Fig. 1, as will hereinafter be described, the slide plates 150 are restored in a rearward direction, that is to the right in Fig. 39. Thus as shown in Figs. 1, 4 and 5 a restoring plate 160 is mounted on a rod 161 that is carried between the forward ends of a pair of levers 162, such levers being pivoted at 163 intermediate the ends thereof. The restoring plate 160 extends upwardly from the rod 161 so that the upper end of the plate 160 is disposed just forwardly of the forward ends of the slide plates 150. When the slide plates 150 are to be restored the levers 162 are rocked in a clockwise direction in the Figure 4, and this is accomplished by a cam 165 mounted on the main cam shaft 108. The cam 165 acts on a roller 166 fixed on the rear end of a lever 167, and this lever 167 is pivoted at 168 intermediate its ends and has a pin and slot connection 169 with the rear end of the lever 162. A spring 170 acts on the lever 167 to maintain the roller 166 thereof in engagement with the cam 165. At the end of a cycle of operation of the machine, the roller 166 rides upon a raised portion 165R of the cam 165 so that the slide plates 150 are at this time held in their restored positions. Soon after a cycle of operation is instituted, the roller 166 rides off of the high portion 165R and the restoring plate 160 is moved forwardly to an ineffective position thereby to permit such forward or left-hand movement, Fig. 1, as may be required with respect to any one of the slide plates 150.

Figures 2, 3:
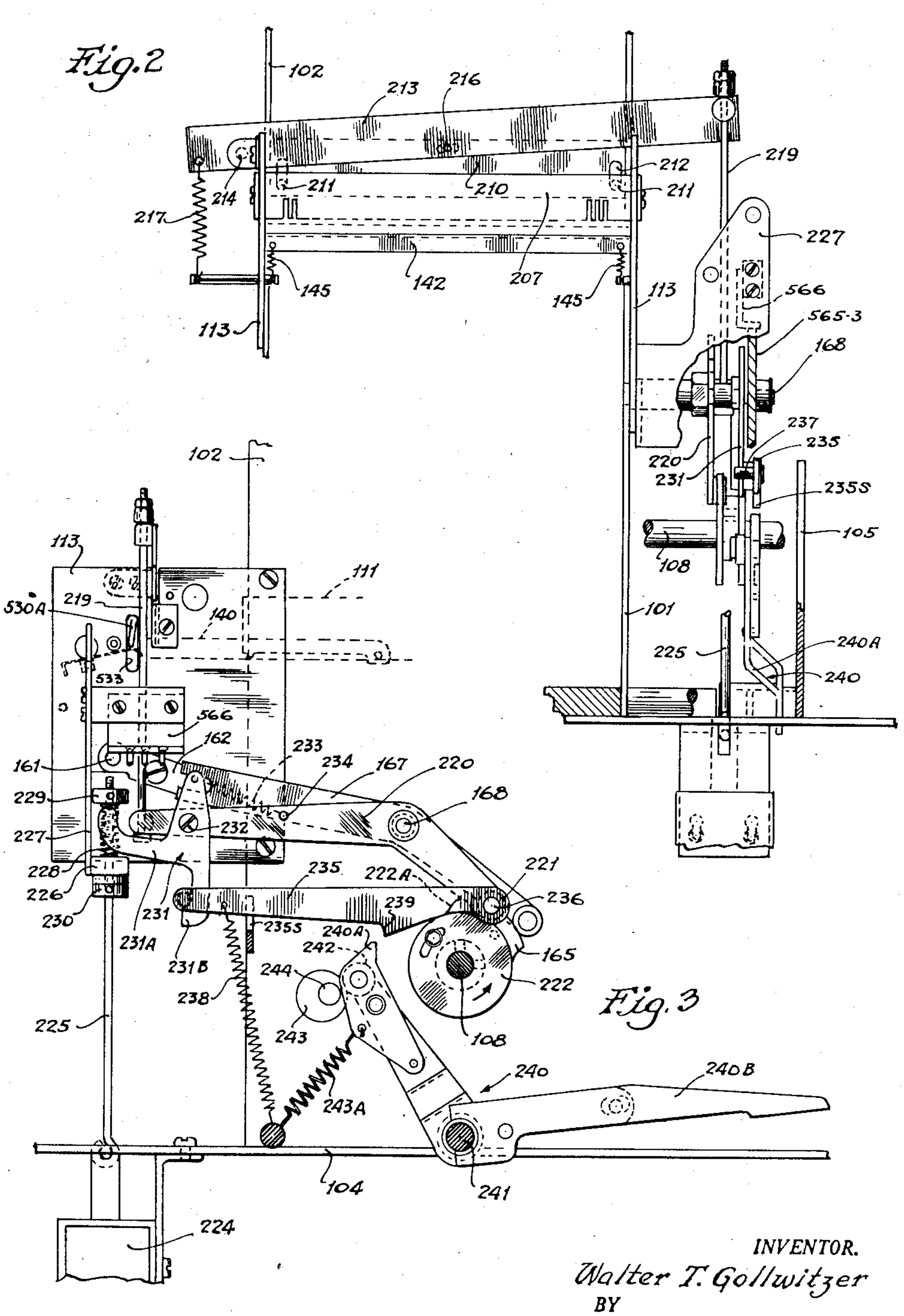
Fig. 2 is a fragmentary end view taken from the left in Fig. 1.
Fig. 3 is a fragmentary view showing a part of the restoring mechanism.

The forward ends of the pawls 140 are guided and maintained in proper position over the related sets of stop pins 152 by a comb plate 207 that is extended between the two plates 113, and near the end of a cycle of operation of the machine, all of the pawls 140 are restored in a downward direction so as to thereby restore the pins 152 that have been set in the course of such cycle of operation. As shown in Figs. 2 and 3, such restoring operation is effected by means of a vertically slidable restoring plate 210 that is disposed over the pawls 140 just rearwardly of the comb 207, and the restoring plate 210 is guided for vertical sliding movement on pins 211 that extend rearwardly from the comb 207 and engage vertical slots 212 formed in the restoring plate 210. An operating lever 213 is disposed just above the comb 207 and is pivoted at 214 on a bracket associated with the left-hand side plate 113 as shown in Fig. 2. The operating lever 213 has a pin and slot connection 216 with the restoring plate 210, and a spring 217 acting on the left-hand end of the lever 213 as viewed in Fig. 2 tends to raise the restoring plate 210 to the raised or retracted position of Fig. 2.

When the pawls 140 and the pins 152 are to be restored, it will be recognized that the slides 111 and the pawls 140 will have been fully restored to their rearward or normal positions, and at this time the right-hand end of the lever 213 is actuated in a downward direction by means including a downwardly extended operating link 219 that is pivoted at its upper end to the right hand end of the lever 213 as viewed in Fig. 2. The lower end of the link 219 is pivoted at one end of a bell crank lever 220 that is pivoted intermediate its ends on a pivot stud 168, and the other end of the bell crank 220 has cam roller 221 thereon that engages a cam 222. Near the end of the machine cycle, and after the slide plates 150 and the associated pins have been restored to their rearward positions by the action of the restoring plate 160, the roller 221 is engaged by a lobe 222A on the cam 222, as shown in Fig. 3, to thereby move the operating lever 213 downwardly to restore the pawls 140 and the pins 152. The roller 221 rides off of the lobe 222A just prior to the end of the machine cycle, thereby to release the pawls 140 and the pins 152 have setting movement or operation in the next cycle of the machine.

The restoring means that are thus afforded for the pawls 140 and the pins 152 are such that they are operated in each cycle of operation of the main cam shaft 108 of the machine, and while this restoring operation is in most instances adequate to take care of the requirements encountered in practice, it has been found that over some circumstances that where the adding machine of the present invention is being utilized in timed relation with other machines such as a printing machine, there may be circumstances where it is desirable to restore the pins 152 and the pawls 140 independently of the operation of the main cam shaft 108 and for this purpose, means are associated with the restoring rod or link 219 for imparting restoring movement thereto independently of the cam shaft 108. In the present instance such means include a control solenoid 224 mounted beneath the base plate 104 and having on operating link 225 extended upwardly from the armature of the solenoid. The upper end of the operating rod 225 is extended through and guided by a guide plate 226 that is afforded at the lower edge of a mounting bracket 227 that is extended laterally from the right-hand plate 113, as viewed in Fig. 2. A spring 228 surrounds the rod 225 above the guide plate 226, and this spring acts against a collar 229 that is mounted on the upper end of the rod 225. The spring 228 is effective to urge the rod 225 upwardly to a position determined by a stop collar 230 that is fixed on the rod so as to engage the guide plate. The collar 229 is thus arranged to be moved downwardly when the solenoid 224 is energized, and in such movement the collar 229 is arranged to engage one arm 231A of a bell crank 231, this bell crank being pivoted at 232 on the arm 220 adjacent to the point where the rod 219 is connected thereto. A spring 233 acting between an upwardly extending arm of the bell 231 and an anchoring pin 234 on the bell crank 220 serves to urge the bell crank 231 to the position shown in Fig. 3. The bell crank 231 also has a downwardly extended hooked arm 231B that normally acts as a latch to hold an arm or pawl 235 in the position shown in Fig. 3. The pawl 235 is pivoted at 236 on the arm 220 coaxially with the roller 221, and a lateral pin 237 at the other or left end of the pawl 235 is engaged by the hooked arm 231B. When the solenoid 224 is energized, the pawl 235 is released, and a spring 238 draws the pawl 235 downwardly so as to move into abutment with a stop 235S to thereby move a shoulder or tooth 239, formed on the pawl 235, into the path of an arm 240A of a constantly operated rocker 240. The arm 240A is therefore effective in its right-hand movement, Fig. 3, to push the pawl 235 to the right, thereby to rock the bell crank 220 and impart downward restoring movement to the rod 219. In the course of such rocking movement of the bell crank 220, the pawl 235 is of course held against downward movement by the stop 235S, while the latch 231 is moved downwardly, and thus the latch 231 is again re-engaged with the pin 237.

The rocker 240 is mounted on a shaft 241, and has a roller 242 mounted on the arm 240A so as to engage an eccentric 243 that is mounted on a constantly rotated drive shaft 244. A spring 243A acting on the arm 240A serves to hold the roller 242 against the eccentric 243, and thus the rocker 240 is rocked through a complete rocking cycle in each rotation of the shaft 244. The shaft 244 is in the present case utilized as a drive shaft which is constantly rotated from a suitable power source, and the shaft 244 is geared to the driving member of a one-revolution clutch as described in said parent application, whereby the cam shaft 108 may be rotated through a single revolution for each cycle of operation of the machine.

The geared relation between the shaft 244 and the clutch is such that the shaft 244 rotates considerably faster than the driven element of the clutch, and I have found that accomplishment of the desired control operations by the rocker 240 may be satisfactorily attained where the shaft 244 makes approximately three and one-half revolutions for each revolution of the shaft 108.

Figure 11:
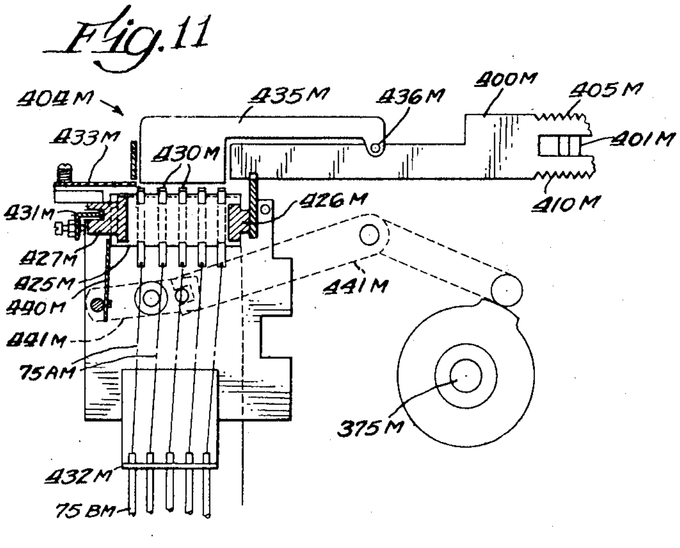
Fig. 11 is a vertical sectional view through the translating mechanism.
Figure 12:
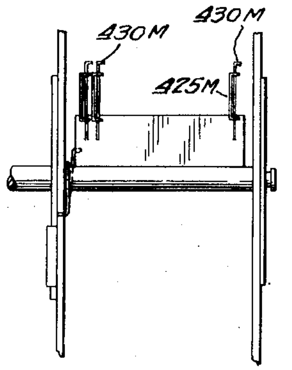
Fig. 12 is an end view showing the relationship of the slide restoring means.

The set up means for controlling the setting of the slides 111 may take other forms such as that illustrated in my aforesaid copending application Serial No. 587,579, and such mechanism has been illustrated in Figs. 8 to 12 of the drawings. As there shown, the set up means 404M whereby the setting of the slides 400M is controlled is substantially the same for each order of the accumulator, or in other words, for each of the slides 400M. Thus, a plurality of set up bars 425M are mounted parallel to and just to the left of the respective slides 400M, and these set up bars are supported in guiding combs 426M and 427M for limited longitudinal movement parallel to the path of movement of the slides 400M. Each of the set up bars 425M has five set up pins 430M mounted therein by means of slots formed in the horizontal edge flanges of the bars 425M for limited vertical movement. The spacing of the pins 430M is such that the right-hand edges thereof are spaced apart in an amount equal to two units of movement of the related slide 400M, while each of the set up bars is adapted to move in an endwise direction through a distance equal to one unit of movement of the related slide 400M. At the beginning of each cycle of operation of the machine, all of the set up bars 425 are in their right-hand positions, Fig. 11, but in the course of set up operation of the mechanism, those set up bars that are disposed in orders wherein an even number is to be represented move to the left through one unit of movement and into abutment with stop means 431M, as will hereinafter be described in detail. The pins 430M are so arranged that when they are in their lower positions, as shown in Fig. 11, they are disposed below the lower edge of the related slide 400M, but when a pin 430M is moved to its upper position, the pin is disposed in the path of movement of the left hand end of the related slide 400M so as to stop the yieldingly induced left hand or set up movement of the slide. The pins 430M are connected to the related Bowden wires 75AM, as shown in Fig. 11, the sheaths 75B, of the Bowden wires being anchored on an anchoring plate 432M that is disposed in a fixed position beneath the supporting combs of the set up means 404M. As to any particular order of the sensing means and the related order of the set up means, the cables 75AM are connected to the pins 430M, in the related order of the set up means in the manner hereinbefore described. With this arrangement, the left-hand pin 430M, Fig. 11, will be actuated each time an odd number is to be represented, and when such a left-hand pin is actuated to its upper positions, it is disposed in such a relation that it will engage a depressible stop plate 433M when forces are applied to the bar 425M in a left-hand direction. Thus under such circumstances the set up bar will move but slightly to the left. As an example, the sensing of perforations in a printing device that are representative of the digit "1" will cause the two end ones of the pins 430M to be moved upwardly, and the left-hand pin will hold the set up bar 425M against appreciable left-hand movement, while the most right-hand pin 430M will stop the movement of the related slide 400M after this slide has moved through one unit of movement. Such action may well be compared with the action in the event that the digit "2" has been represented on the printing and control device. In such an instance only the most right-hand one of the pins 430M will be actuated to its upper position, and hence the related slide 400M will move one unit before it engages the pin 430M that has been set, and will then move through an additional unit until such time as the left-hand end of the set up bar engages the stop plate 433M. A similar action is attained with respect to all of the other digits that may be represented by the code 1A. After the restoring movement of the slides 400M has been completed all of the pins 430M are restored to their lowermost positions, and the restoring movement of the pins 430M is accomplished by a plurality of lever arms 435M, one of which is pivotally connected at 436M to each of the slides 400M. These lever arms overlie the row of pins 430M that are related to the respective slides upon which such lever arms are mounted, and after the slides have been restored to their zero positions, all of the lever arms 435 are moved downwardly by bail or by means, similar to the bar 210 that overlies the several levers 435M. When the lever arms 435M are in their lower or restored positions the left-hand ends thereof are positioned in engagement with a stop plate 439M, and thus each slide 400M will be retained in its zero position unless the actuation of one or more pins 430M has raised the associated lever arm 435M so as to disengage the same from the stop plate 439M.

Since the set up bars 425M may in many instances move to the left from the normal positions shown in Fig. 11, means are also afforded for restoring these set up bars to their normal positions. In the present case such means comprise a rocking plate 440M that is operated by a bell crank 441M and cam means, Fig. 11, provided on the cam shaft 375M.

From the foregoing description it will be evident that the present invention affords an advantageous translator mechanism which is mechanical in form and which is of such a character that it may be used advantageously as the set-up means for the slides of an adding unit or the like.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a mechanism of the character described for translating a five-element positional number code into a ten-element positional number code, a settable element having a normal zero position and shiftable through setting movement in a setting direction from said zero position and selectively into any one of nine other positions representative of the digits in succession from one to nine, and each spaced from the adjacent positions in a predetermined amount representative of one unit, yielding means urging said settable element in said setting direction, means on said element affording an abutment shoulder facing in said setting direction, a normally stationary abutment facing toward said shoulder and so disposed that when said element is in said zero position said shoulder is spaced from said abutment in an amount equal to ten times said predetermined amount, a set up member mounted for longitudinal movement parallel to the path of movement of said settable element from a normal position to a second position that is displaced from said normal position in said predetermined amount in said setting direction, a retaining member shiftably mounted on said element to extend over said set-up member and having an end shoulder adapted to releasably engage said stationary abutment to hold said element in said zero position, five set up pins slidable on said set up member for movement transversely of said direction from normal positions to set positions wherein said retaining member is engaged by such pin and is pivoted to release said retaining member from said stationary abutment, said pins in their set positions being disposed in the path of said abutment shoulder as said settable element moves in said setting direction, one of said pins when set being adapted to engage said stationary abutment to retain said set up member in said normal position, and said pins being disposed on said set up member in positions such that the corresponding effective faces of the pins are spaced from each other in an amount equal to twice said predetermined amount, whereby the other pins may be selectively actuated to represent and control the setting of the slide for the even digits 2, 4, 6, or 8, while selective setting of said other pins together with said one pin may represent and control the setting of the slide for the odd digits 1, 3, 5 or 7, and setting of said one pin alone may represent and correspondingly control the setting of the slide for the odd digit 9.

2. In a mechanism for translating a five-element positional number code into a ten-element positional number code, a slide mounted for longitudinal setting movement in one direction from a normal position representative of zero to nine other positions each spaced from the adjacent positions in a predetermined amount representative of one unit and said other positions being representative of the digits in succession from one to nine, a restoring means for moving said slide through a restoring movement in the opposite direction and into said zero representing position, yielding means urging said slide in said setting direction, means on said slide affording an abutment shoulder facing in said one direction, a normally stationary abutment facing toward said shoulder and so disposed that when said slide is in said zero position said shoulder is spaced from said abutment in an amount equal to ten times said predetermined amount, a set up bar mounted for limited longitudinal movement parallel to the path of movement of said slide from a normal position to a second position that is displaced from said normal position in said predetermined amount in said one direction, a retaining member pivoted on said slide to extend over said set up bar and having an end shoulder adapted to releasably engage said stationary abutment to hold said slide in said zero position, five set up pins slidable transversely on said set up bar from normal positions to set positions wherein said retaining member is engaged by such pin and is pivoted to release said retaining member from said stationary abutment, said pins in their set positions being disposed in the path of said shoulder as said slide moves in said one direction, one of said pins when set being adapted to engage said stationary abutment to retain said set up bar in said normal positions such that the corresponding effective faces of the pins are spaced from each other in an amount equal to twice said predetermined amount, whereby the other pins may be selectively actuated to represent and control the setting of the slide for the even digits 2, 4, 6 or 8, while selective setting of said other pins together with said one pin may represent and control the setting of the slide for the odd digits 1, 3, 5 or 7, and setting of said one pin alone may represent and correspondingly control the setting of the slide for the odd digit 9.

3. In a mechanism of the character described, a settable element shiftable through setting movements from a normal zero position successively into equally spaced positions representative of the digits in succession from 1 to 9, inclusive, means for yieldingly urging said element through such setting movements, restoring means opposing said yielding means for controlling such setting movements and for restoring said element to said zero position, a set up member mounted for limited movement along a path parallel to said setting movements of said element from a normal position to a second position spaced apart in a predetermined distance equal to the spacing of adjacent ones of said positions of said element, latching means including a latch member on said element and a stationary abutment with which said latch member may be engaged to hold said element in said zero position, five set up pins mounted on said set-up member in positions spaced from each other longitudinally of said member in an amount equal to twice said predetermined distance and for set-up movement transversely of said path and each engageable with said latch member to release the same as an incident to set up movement of a pin, a shoulder on said element, said pins having stop surfaces thereon each arranged to be disposed in the path of said shoulder when a respective pin is set, the pin most remote from said shoulder having a second surface operable to engage said stationary abutment when said last-mentioned pin is set to retain said set up member in said normal position.

4. In a mechanism of the character described, a settable element shiftable through setting movements from a normal zero position successively into equally spaced positions representative of the digits from 1 to 9, inclusive, means for yieldingly urging said element through such setting movements, restoring means opposing said yielding means for controlling such setting movements and for restoring said element to said zero position, a set up member mounted for limited movement along a path parallel to said setting movements of said element from a normal position to a second position spaced apart in a predetermined distance equal to the spacing of adjacent ones of said positions of said element, latching means including a latch member of said element and a stationary abutment with which said latch member may be engaged to hold said element in said zero position, five set up pins mounted on said set-up member in positions spaced longitudinally of said member in an amount equal to twice said predetermined distance and for set-up movement transversely of said path and each engageable with said latch member to release the same as an incident to set up movement of a pin, a shoulder on said element said pins having stop surfaces thereon each arranged to be disposed in the path of said shoulder when a respective pin is set, the pin most remote from said shoulder having a second surface operable to engage said stationary set-up member in said normal position, means for restoring said latch to its effective position, and means for restoring said set up member to its normal position.

WALTER T. GOLLWITZER.

No references cited.